No. 719,914. PATENTED FEB. 3, 1903.
A. E. WAHLIN.
BICYCLE BRAKE.
APPLICATION FILED AUG. 28, 1901.
NO MODEL.
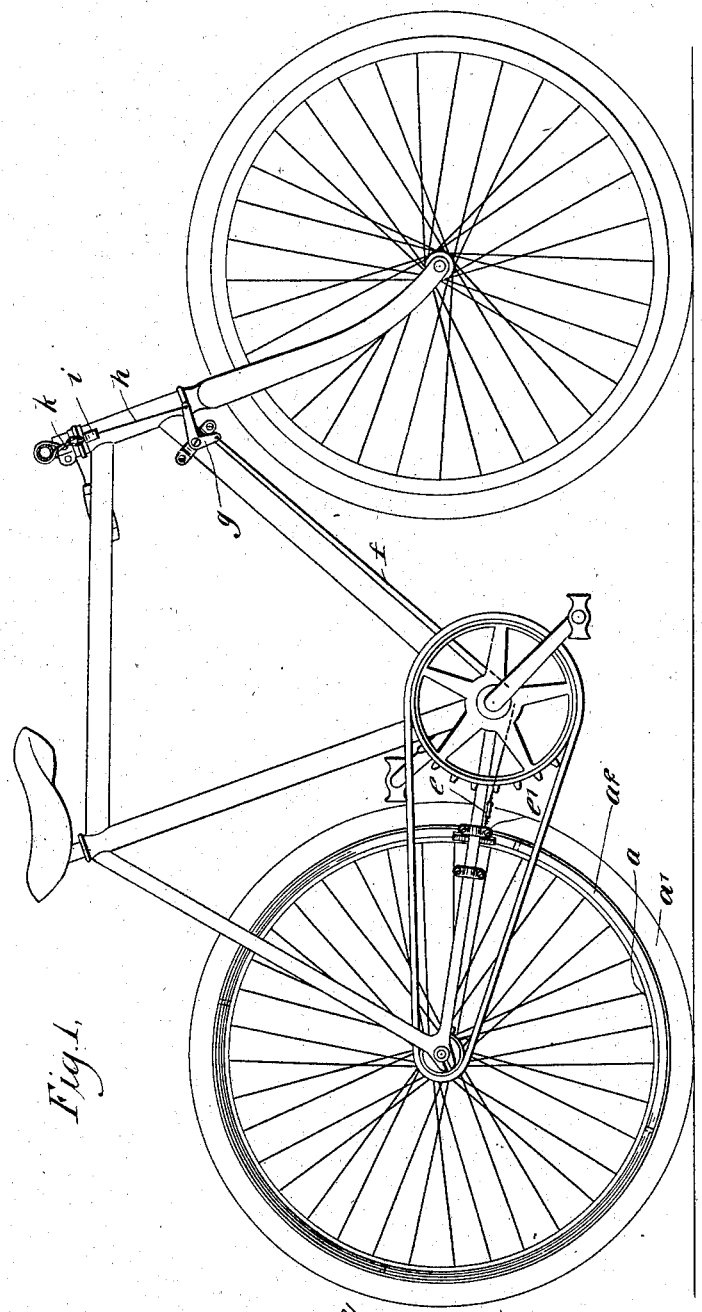
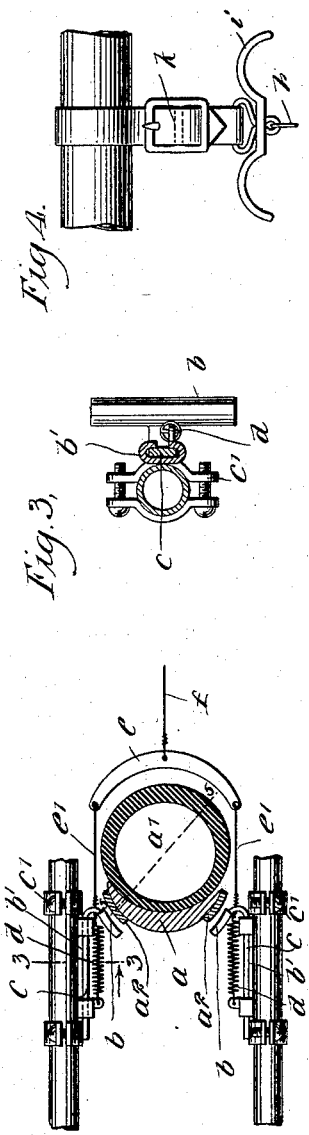
WITNESSES:
Edward Thorpe
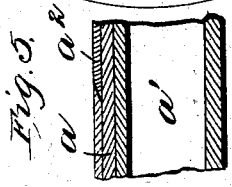
INVENTOR
Albert E. Wahlin
BY Munn
ATTORNEYS

UNITED STATES PATENT OFFICE.

ALBERT E. WAHLIN, OF FAIRVIEW, UTAH.

BICYCLE-BRAKE.

SPECIFICATION forming part of Letters Patent No. 719,914, dated February 3, 1903.

Application filed August 28, 1901. Serial No. 73,519. (No model.)

*To all whom it may concern:*

Be it known that I, ALBERT E. WAHLIN, a citizen of the United States, and a resident of Fairview, in the county of Sanpete and State of Utah, have invented a new and Improved Bicycle-Brake, of which the following is a full, clear, and exact description.

This invention relates to a brake which is arranged to work against the rim of a bicycle-wheel as contradistinguished from the tire thereof; and it comprises certain novel features of construction, which will be hereinafter pointed out.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1 is a side view of a bicycle equipped with my invention. Fig. 2 is a sectional plan view of the invention. Fig. 3 is a detail section on the line 3 3 of Fig. 2. Fig. 4 is a detail elevation of the handle-bar attachment for operating the brake, and Fig. 5 is a detail section on the line 5 5 of Fig. 2.

$a$ indicates the rim of the rear wheel of a bicycle, and $a'$ the tire. $a^2$ indicates strips of brass or other like material fastened to the inner face of the rim at each side of the spokes thereof, these strips of brass or other material being arranged in segments and having their end edges cut diagonally, so as to match together, as indicated in Fig. 5.

$b$ indicates two brake-shoes which are arranged one at each side of the rim of the wheel so as to bear, respectively, against the strips $a^2$. These brake-shoes $b$ are carried by slides $b'$, which run on guide-rails $c$, fastened to the bicycle-frame adjacent to the rear wheel by means of clips $c'$. These brake-shoes are therefore arranged at each side of the rear wheel of the bicycle, and they are held normally inactive by retractile springs $d$, connected to the brake-shoes and to the guides $c$. By pressing the brake-shoes forward against the tension of the springs $d$ the shoes $b$ may be engaged with the wheel, so as to retard the movement thereof.

$e$ indicates a spreader connected by cords or wires $e'$ with the brake-shoes $b$. $f$ indicates a cord connected with the center of the spreader $e$ and passing under the crank-hanger of the bicycle upward to a bell-crank lever $g$, arranged at the front of the bicycle-frame just below the handle-bars. From the bell-crank lever $g$ extends a cord or wire $h$, which passes upward to a finger-piece $i$, suspended from the handle-bar of the bicycle by means of a strap or other flexible device $k$. By drawing up the finger-piece $i$ the movement may be transmitted through the parts $g, f, e$, and $e'$ to the brake-shoes $b$ and the brakes applied. By releasing the piece $i$ the springs $d$ will be permitted to return the brakes to inactive position. The bicycle may thus be effectively controlled without involving the necessity of applying the brakes to the tire, which is thereby put in danger.

Various changes in the form, proportions, and minor details of my invention may be resorted to without departing from the spirit and scope of my invention. Hence I consider myself entitled to all such changes as may lie within the scope of my claims.

Having thus described my invention, I claim as new and desire to secure by Letters Patent—

1. A bicycle-brake, comprising brake-shoes arranged one at each side of the rim of the rear wheel of a bicycle, and adapted to engage the inner face of the rim, slides carrying said brake-shoes at their forward ends, guide-rails comprising flat bars on the edges of which the said slides run, clips for fastening said guide-rails to the bicycle-frame, springs located at the inner sides of the guide-rails and connected at one end with the brake-shoes and at the other end with projecting lugs on the guide-rails to move the brake-shoe in a rearward inactive direction, a spreader arranged in front of the rear wheel, connections between the ends of the spreader and the forward ends of the brake-shoes, a cord or wire connected with the spreader and passing forward under and in direct engagement with the crank-hanger, a bell-crank lever arranged at the front of the frame below the handle-bar and to one arm of which said cord or wire is connected, a finger-piece connected by a cord or wire with the other arm of said bell-crank lever, and adapted when drawn up to apply the brakes, and a flexible device suspending said finger-piece from the handle-bar of the bicycle.

2. The combination with the rear wheel of a bicycle, of a brake therefor, a cord or wire directly engaging the under face of the crank-hanger and having connection with the brake to operate it, a bell-crank lever arranged at the front of the bicycle-frame below the handle-bar, the said cord or wire being connected to one arm of said lever, a transversely-extending finger-piece having curved ends and arranged beneath the handle-bar and connected by a cord or chain with the other arm of the bell-crank lever whereby when the finger-piece is lifted the brake is applied, and a flexible strap passing around the handle-bar and connected with the central portion of said finger-piece to suspend the same, as set forth.

In testimony whereof I have signed my name to this specification in the presence of two subscribing witnesses.

ALBERT E. WAHLIN.

Witnesses:
M. A. BOYDEN,
JAMES ORTON.